United States Patent
Chou

(10) Patent No.: US 10,555,634 B2
(45) Date of Patent: Feb. 11, 2020

(54) COOKING MACHINE FOR WEIGHING FOOD

(71) Applicant: T. F. ELECTRICAL TECHNOLOGY (SHENZHEN) CO., LTD., Shenzhen, Guangdong (CN)

(72) Inventor: Wenhung Chou, Guangdong (CN)

(73) Assignee: T.F. ELECTRICAL TECHNOLOGY (SHENZHEN)CO., LTD., Shenzhen, Guangdong (CN)

( * ) Notice: Subject to any disclaimer, the term of this patent is extended or adjusted under 35 U.S.C. 154(b) by 507 days.

(21) Appl. No.: 15/314,143

(22) PCT Filed: Dec. 14, 2015

(86) PCT No.: PCT/CN2015/097256
§ 371 (c)(1),
(2) Date: Nov. 28, 2016

(87) PCT Pub. No.: WO2017/100976
PCT Pub. Date: Jun. 22, 2017

(65) Prior Publication Data
US 2018/0110354 A1    Apr. 26, 2018

(51) Int. Cl.
*A47J 27/00* (2006.01)
*A47J 43/07* (2006.01)

(52) U.S. Cl.
CPC ......... *A47J 27/004* (2013.01); *A47J 43/0716* (2013.01); *A47J 2043/0733* (2013.01)

(58) Field of Classification Search
CPC .............. A47J 2043/0733; A47J 27/004; A47J 43/0716; A47J 43/085; A47J 43/0727; A47J 43/08

USPC .................................. 99/342–343, 352, 493
See application file for complete search history.

(56) References Cited

FOREIGN PATENT DOCUMENTS

| CN | 201542451 | 8/2010 |
|---|---|---|
| CN | 202653919 | 1/2013 |
| CN | 202698898 | 1/2013 |
| CN | 205410823 | 8/2016 |
| JP | H01171516 | 7/1989 |
| JP | H0975228 | 3/1997 |
| JP | 2005230224 | 9/2005 |

OTHER PUBLICATIONS

Chinese to English machine translation of Gu (CN 202698898).*
International Search Report filed in PCT/CN2015/097256 dated Sep. 8, 2016.

* cited by examiner

*Primary Examiner* — Michael G Hoang
(74) *Attorney, Agent, or Firm* — Rankin, Hill & Clark LLP

(57) ABSTRACT

A cooking machine for weighing food includes a housing, a heating tray assembly, a transmission wheel, a motor, a transmission mechanism, a holder and a weighing mechanism; the holder has a first end and a second end; the first end protrudes into an underneath of the heating tray assembly; the second end is fixed to the housing; the motor is fixed to the second end; the heating tray assembly is supported on the weighing mechanism. When the cooking cup is placed on the heating tray assembly, the weighing mechanism only supports the heating tray assembly and the cooking cup, which significantly reduces the weight of the scale pan of the weighing mechanism, thereby improving weighing accuracy and precision.

13 Claims, 3 Drawing Sheets

COOKING MACHINE FOR WEIGHING FOOD

FIELD OF THE INVENTION

The present application relates to the field of kitchen supplies, especially to a cooking machine for weighing food.

BACKGROUND OF THE INVENTION

A variety of ingredients will be used during kitchen cooking. However, if the amount of each of ingredients is different, the flavor of the cooked food is also different. In order to cook up food with good flavor, each of the ingredients should always be weighed, and during cooking, put into the cooking machine in sequence according to cooking steps. However, in this way, a lot of wares are required to hold weighed ingredients, which occupy much space of the kitchen. Furthermore, wares have no label thereon, and hence are easily mistaken. Therefore, a structure of an electronic scale mounted beneath a cooking machine is provided in the prior art, which forms a cooking machine for weighing food. When the ingredients are input into a cooking cup of the cooking machine, the weight of the ingredients can be weighed at the same time. Because of features of the electronic scale, the weight of the scale pan is normally relatively light in order to ensure weighing precision and accuracy of the electronic scale. However, a cooking machine includes not only the cooking cup, but also a housing, a blender structure normally arranged beneath the cooking cup, a heating tray assembly for supporting the cooking cup, a transmission wheel for driving the blender structure to rotate, a motor and a transmission mechanism. The cooking cup is heated by the heating tray assembly; the motor transmits through the transmission mechanism to drive the transmission wheel to rotate, and drive the blender structure to rotate so as to blend the ingredients in the cooking cup for cooking. This will make the cooking machine heavier, and only an electronic scale with a wider range can be used. The electronic scale is arranged beneath the cooking machine, which means the cooking machine as a whole is the scale pan of the electronic scale, and the weight of the ingredients in the cooking cup is lighter than the weight of the cooking machine, therefore, a cooking machine for weighing food of such a structure possesses lower precision, poor accuracy and low reliability.

SUMMARY OF THE INVENTION

Technical Problem

A purpose of the invention is to provide a cooking machine for weighing food, and aims to overcome the problems that the cooking machine for weighing food in the prior art possesses lower precision, poor accuracy and low reliability.

Technical Solutions

The present invention is realized by a cooking machine for weighing food which includes a housing, a heating tray assembly configured to support and heat a cooking cup, a transmission wheel configured to drive a blender structure of the cooking cup to rotate, a motor configured to drive gears to rotate and a transmission mechanism configured to connect the transmission wheel with the motor; the cooking machine for weighing food further includes a holder configured to support the transmission mechanism and a weighing mechanism configured to weight food inside the cooking cup; the holder has a first end and a second end; the first end protrudes into an underneath of the heating tray assembly; the transmission wheel is mounted on the first end of the holder; the second end is fixed to the housing; the motor is fixed to the second end; the weighing mechanism is arranged below the first end of the holder; the heating tray assembly is supported on the weighing mechanism.

Furthermore, the cooking machine for weighing food further includes multiple groups of elastic assemblies configured to elastically support the heating tray assembly; each of the elastic assemblies is connected to the weighing mechanism.

Furthermore, the weighing mechanism includes a sensor configured to weigh, an upper holder configured to abut against and press one end of the sensor, and a lower holder configured to support the other end of the sensor; each of the elastic assemblies is connected to the upper holder.

Furthermore, the upper holder includes an abutting and pressing plate configured to abut against and press the sensor, and connection poles respectively arranged at four corners of the abutting and pressing plate; the elastic assemblies are divided into four groups arranged at the bottom of the heating tray assembly; the four groups of elastic assemblies are respectively connected to four connecting poles.

Furthermore, a central portion of the abutting and pressing plate abuts against and presses the sensor; and the width of the central portion of the abutting and pressing plate is narrower than the width of the two ends.

Furthermore, each group of the elastic assemblies include a bolt fixedly connected to the heating tray assembly and a spring sheathed around the bolt; each of the connecting poles is provided with a through hole. The bolt is inserted into corresponding through hole in a sliding way; two ends of the spring respectively abut against and push the heating tray assembly and corresponding connecting pole.

Furthermore, each group of elastic assemblies further include a gasket which is arranged between the spring and the connecting pole.

Furthermore, the lower holder is in U shape; two ends of the lower holder are fixedly connected to the holder; the sensor is fixed to the bottom of the lower holder.

Furthermore, bottom of the lower holder extends in the directions of two sides of the lower holder to form a supporting plate.

Furthermore, the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

Beneficial Effect

By providing the holder, the second end of the holder is fixed within the housing; the motor is fixed to the second end of the holder; the transmission mechanism is mounted on the holder; the first end of the holder is protruded to the underneath of the heating tray assembly and the heating tray assembly is supported on the weighing mechanism. When the cooking cup is placed on the heating tray assembly, the weighing mechanism only supports the heating tray assembly and the cooking cup, which significantly reduces the weight of the scale pan of the weighing mechanism, thereby improving the weighing accuracy and precision.

DETAILED DESCRIPTION OF THE PREFERRED EMBODIMENT

In order to make the purposes, technical solutions, and advantages of the present invention more clear, the present invention will be further described in detail hereinafter with reference to accompanying drawings and embodiments. It should be understood that the specific embodiments described herein are merely intended to explain but not to limit the present application.

Figure 1:
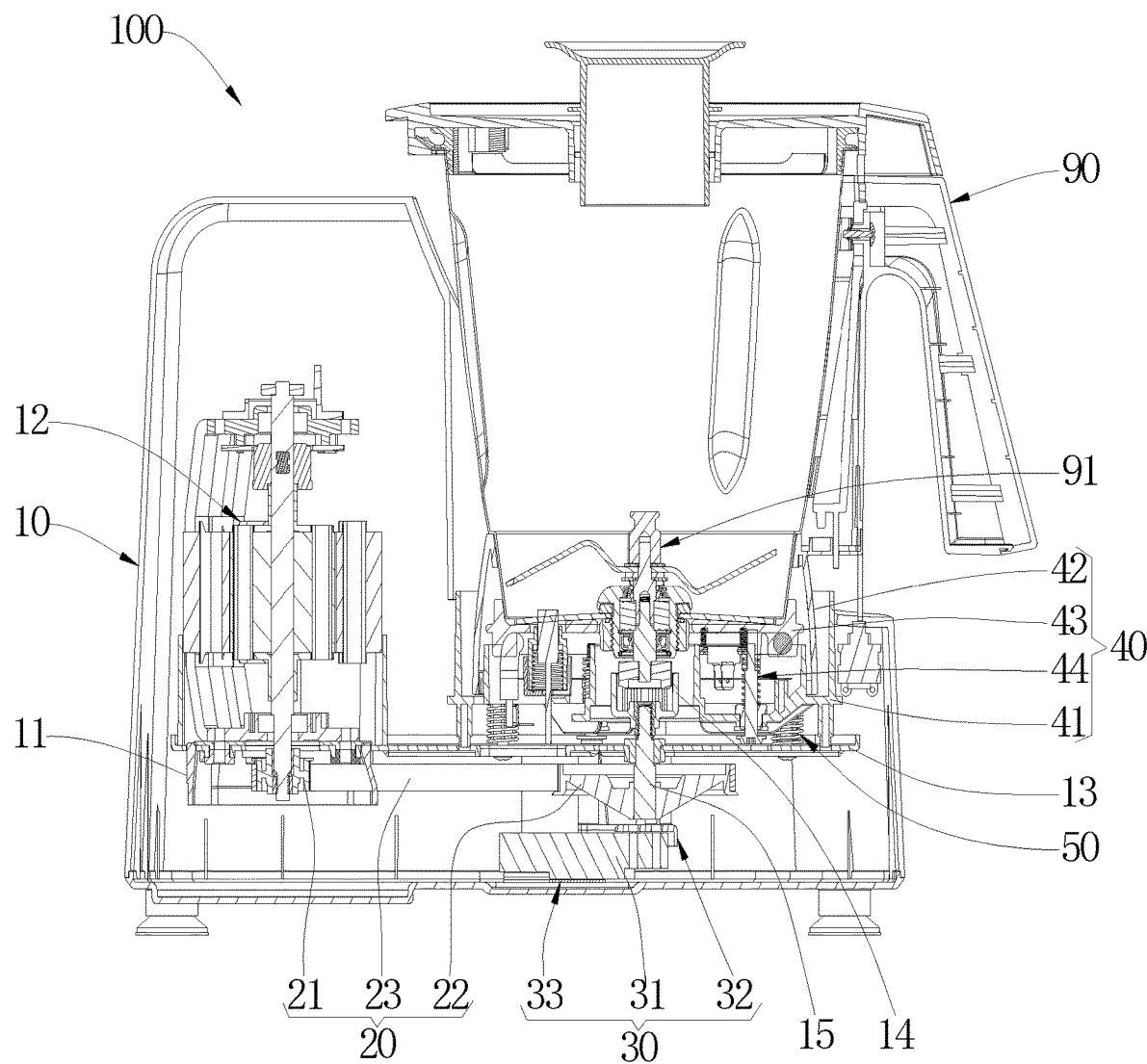
FIG. 1 is a sectional structural schematic view of a front view of a cooking machine for weighing food provided by an embodiment of the invention.
Figure 2:
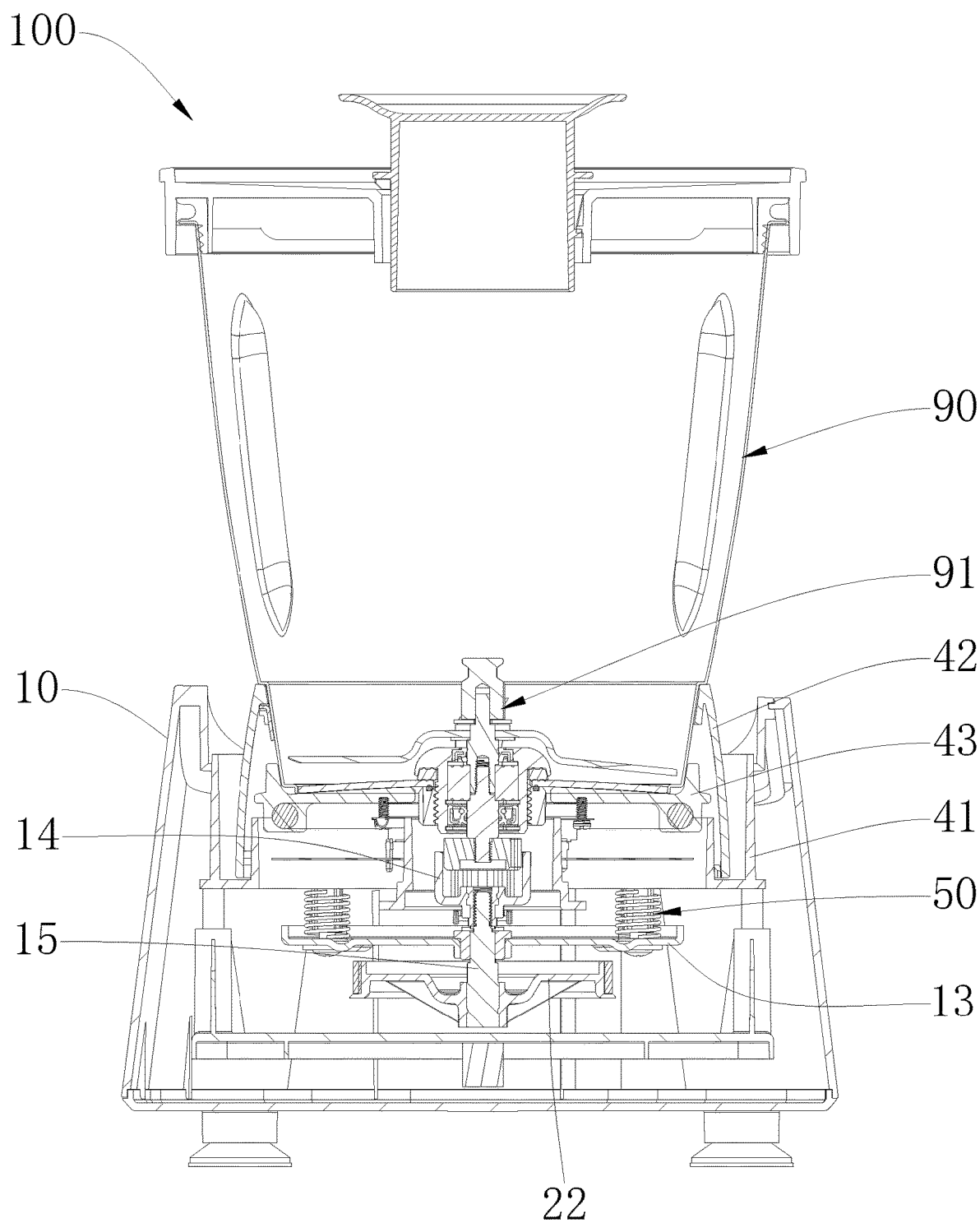
FIG. 2 is a sectional structural schematic view of a side view of the cooking machine for weighing food of FIG. 1.
Figure 3:
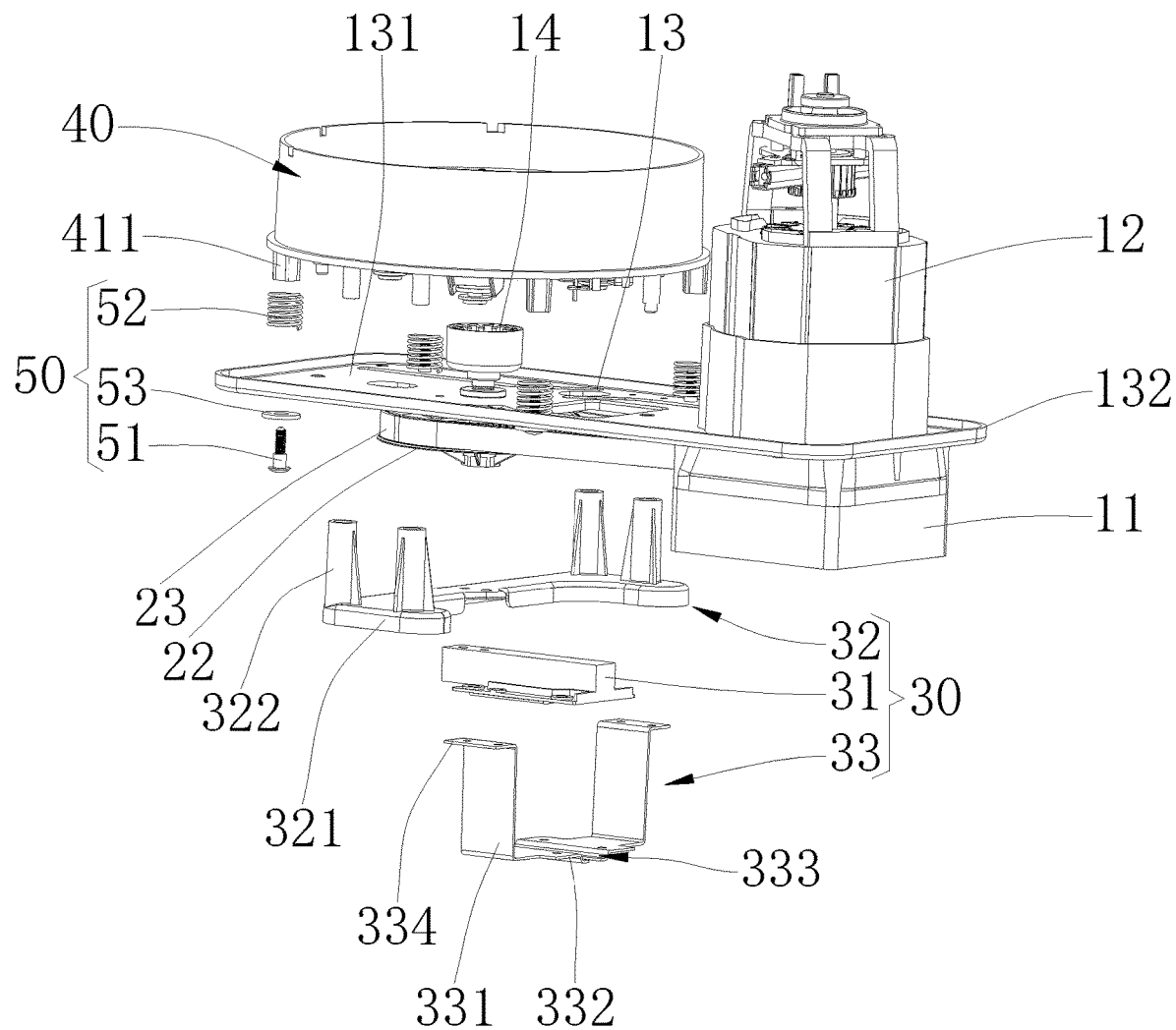
FIG. 3 is a breakdown structural schematic view of a partial structure of the cooking machine for weighing food of FIG. 1.

Please refer to FIGS. 1,2 and 3, an embodiment of the invention provides a cooking machine for weighing food 100 which includes a housing 10, a heating tray assembly 40, a transmission wheel 14, a motor 12, a transmission mechanism 20, a holder 13 and a weighing mechanism 30; the heating tray assembly 40 is configured to support the cooking cup 90 and heat the cooking cup 90 so as to cook; the transmission mechanism 20 is mounted on the holder 13; the transmission mechanism 20 is supported by the holder 13. The transmission mechanism 20 connects the motor 12 with the transmission wheel 14. When the cooking cup 90 is placed on the heating tray assembly 40, a blender structure of the cooking cup 90 is connected with the transmission wheel 14. The motor 12 can drive the transmission wheel 14 to rotate so as to drive the blender structure 91 to rotate. The holder 13 has a first end 131 and an opposite second end 132; the first end 131 of the holder 13 protrudes into an underneath of the heating tray assembly 40. The transmission wheel 14 is mounted at the first end 131 of the holder 13, and the second end 132 of the holder 13 is fixed within the housing 10; the motor 12 is fixed to the second end 132; the heating tray assembly 40 is supported on the weighing mechanism 30, then, when the cooking cup 90 is placed on the heating tray assembly 40, the weighing mechanism 30 only supports the heating tray assembly 40 and the cooking cup 90, and the weighing mechanism 30 will not be burdened by the weight of the transmission mechanism 20, the motor 12 and the transmission wheel 14, which correspondingly reduces the weight of the scale pan of the transmission mechanism 30, thereby weighing the ingredients in the cooking cup 90 more accurately. Furthermore, an electronic scale with a relatively small weighing range can be used so as to improve weighing precision.

By arranging the holder 13, the second end 132 of the holder 13 is fixed within the housing 10; the motor 12 is fixed at the second end 132 of the holder 13; the transmission mechanism 20 is mounted on the holder 13; the first end 131 of the holder 13 is protruded into the underneath of the heating tray assembly 40; the heating tray assembly 40 is supported by the weighing mechanism 30. When the cooking cup 90 is placed on the heating tray assembly 40, the weighing mechanism 30 only supports the heating tray assembly 40 and the cooking cup 90, which significantly reduces the weight of the scale pan of the weighing mechanism 30, thereby improving weighing accuracy and precision.

Furthermore, the cooking machine for weighing food 100 further includes multiple groups of elastic assemblies 50 configured to elastically support the heating tray assembly 40 such that when the cooking cup 90 is vibrating, the cooking cup 90 can still keep close contact with the heating tray assembly 40. Each of the elastic assemblies 50 is connected to the weighing mechanism 30; the weighing mechanism 30 supports each of the elastic assemblies 50, thereby supporting the heating tray assembly 40. Furthermore, by arranging the elastic assemblies 50, the heating tray assembly 40 can abut against and press the weighing mechanism 30 better. When the transmission wheel 14 rotates, the heating tray assembly 40 will vibrate with the transmission wheel 14. The elastic assemblies 50 can act as a buffer which reduces the vibration of the weighing mechanism 30 and make the weighing mechanism 30 weigh more accurately.

Furthermore, the weighing mechanism 30 includes a sensor 31, an upper holder 32 and a lower holder 33; each of the elastic assemblies 50 is connected to the upper holder 32 which is configured to abut against and press one end of the sensor 31; the lower holder 33 supports the other end of the sensor 31, such that when the cooking cup 90 is placed on the heating tray assembly 40, the elastic assemblies 50 was pushed down, and thereby the upper holder 32 was also pushed down so as to abut and press one end of the sensor 31 for weighing food inside the cooking cup 90. By utilizing the sensor 31, the precision is higher. In the embodiment, there is one sensor 31 which is arranged in the center of the underneath of the heating tray assembly 40; a weighing accuracy of 1 g can be achieved. In other embodiments, there can also be multiple sensors 31 such that the weigh is more precise. The sensor 31 can be a stress strain gage.

Furthermore, the upper holder 32 includes an abutting and pressing plate 321 and four connecting poles 322; the four connecting poles 322 are respectively arranged at four corners of the abutting and pressing plate 321. The elastic assemblies 50 are divided into four groups which are arranged at the bottom of the heating tray assembly 40. The four groups of elastic assemblies 50 are respectively connected to the four connecting poles 322, such that the sensor 31 can be abutted against and pressed by the abutting and pressing plate 321. The structural configuration can make the weight of the upper holder 32 lighter, thereby reducing the weight of the scale pan of the sensor 31, such that the sensor 31 can weigh more precisely. In other embodiments, the upper holder can be configured as a U shaped structure. Two ends of the U-shaped upper holder are respectively connected to the elastic assemblies 50, and bottom of the U-shaped upper holder can abut against and press the sensor 31.

Furthermore, a central portion of the abutting and pressing plate 321 abuts against and presses the sensor 31, and the width of the central portion of the abutting and pressing plate 31 is narrower than the width of the two ends. Setting the central portion of the abutting and pressing plate 321 to be relatively narrow can further reduce the weight of the upper holder 32, and correspondingly reduce the weight of the scale pan of the sensor 31, such that the sensor 31 can weight more precisely.

In the embodiment, each group of the elastic assemblies 50 includes a bolt 51 and a spring 52. Each of the connecting poles 322 is provided with a through hole (not shown). The bolt 51 is inserted into the through hole of corresponding connecting pole 322 in a sliding way; the bolt 51 is fixedly connected to the heating tray assembly 40 and the spring 52 is sheathed around the bolt 51; two ends of the spring 52 respectively abut against and push the heating tray assembly 40 and corresponding connecting pole 322, such that the bold 51 can slide on the connecting pole 322, and two ends of the spring 52 respectively abut against and push the heating tray assembly 40 and corresponding connecting pole 322 so as to elastically support the heating tray assembly 40, such that when the heating tray assembly 40 vibrates, the cooking cup 90 can still keep close contact with the heating tray assembly 40. Furthermore, the spring 52 can also function as a buffer which reduces the vibration of the upper holder 32 and make the upper holder 32 abut against and press the sensor 31 steadily, such that the sensor 31 can weigh more precisely. In other embodiments, the upper holder can also be tabular, and the elastic assemblies can be an elastic extension tube which is mounted on the tabular upper holder and supports the heating tray assembly.

Furthermore, each group of elastic assemblies 50 further includes a gasket 53 which is arranged between the spring 52 and corresponding connecting pole 322. By arranging the gasket 53, the spring 52 can abut against and hold the gasket 53 so as to protect the connecting pole 322.

Furthermore, the lower holder 33 is in U shape; tow ends of the lower holder 33 are fixedly connected to the holder 13; the sensor 31 is fixed to the bottom of the lower holder 33. By configuring the lower holder 33 to be of U shape and fixedly connecting the sensor 31 to the bottom of the lower holder 33, the sensor 31 can be supported more steadily; by fixedly connecting the two ends of the lower holder 33 to the holder 13, the weighing mechanism 30 can be supported by the holder 13, such that after each of components of the cooking machine are assembled, the cooking machine can be mounted in the housing 10; the assembling efficiency is higher. In other embodiments, the lower holder 33 can also be fixed within the housing 10.

Furthermore, the bottom 331 of the lower holder 33 extends in the directions of two sides of the lower holder 33 to form a supporting plate 332. By arranging the supporting plate 332 at the bottom of the lower holder 33, the sensor 31 can be supported better and more steadily. In the embodiment, the lower holder 33 can be a U-shaped structure constituted by two supporting frames. In other embodiments, the lower holder 33 can be also an integral structure.

Furthermore, a central portion of the supporting plate 332 is provided with a groove 333 for positioning the sensor 31 cooperatively. By configuring the groove 333, the sensor 31 is more convenient to be positioned and supported.

Furthermore, two ends of the lower holders 33 are provided with a connecting plate 334 so as to fixedly connect the lower holder 33 to the holder 13 through a screw conveniently. In other embodiments, two ends of the lower holder 33 can also be clamped to the holder 13 through a buckle structure.

Furthermore, the transmission mechanism 20 includes a driven wheel 22 connected to the transmission wheel 14, a driving wheel 21 connected to the motor 12, and a belt 23 configured to connect the driven wheel 22 to the driving wheel 21; the driven wheel 22 and the driving wheel 21 are both mounted on the holder 13 in a rotating way. Through the transmission of the belt, the transmission mechanism 20 can be adapted to the vibration of the holder 13 better, and reduce the vibration of the holder 13. In other embodiments, other transmission mechanism, such as a chain transmission mechanism can also be utilized. In the embodiment, the driven wheel 22 is mounted at the bottom of the holder 13; corresponding driving wheel 21 is arranged at the bottom of the holder 13; the transmission wheel 14 is mounted at an upper surface of the holder 13, and the transmission wheel 14 and the driven wheel 22 are connected through a spindle 15.

Furthermore, the housing 10 is configured with a fixing seat 11 so as to fix the second end 132 of the holder 13 better.

In the embodiment, the motor 12 is fixed to the second end 132 of the holder 13, and the second end 132 of the holder 13 can be pressed by the motor 12 so as to stabilize the holder 13 better.

Furthermore, in the embodiment, the heating tray assembly 40 includes an annular seat 41, a heating tray 43 arranged in the annular seat 41 and a supporting ring 42 configured to support the annular seat 41; a bottom of the annular seat 41 is configured with an erection column 411 for connecting to the elastic assemblies 50 more conveniently. The supporting ring 42 is configured to support the cooking cup 90. The structure is easy to be processed and manufactured, and the assembly among each portion is convenient. Furthermore, the heating tray 43 can be fixedly connected to the annular seat 41 through an elastic buffering mechanism 44, such that the heating tray 43 is in good contact with the cooking cup 90, thereby heating the cooking cup 90.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A cooking machine for weighing food, which comprises a housing, a heating tray assembly configured to support and heat a cooking cup, a transmission wheel configured to drive a blender structure of the cooking cup to rotate, a motor configured to drive the transmission wheel to rotate and a transmission mechanism configured to connect the transmission wheel with the motor; wherein the cooking machine for weighing food further comprises a holder configured to support the transmission mechanism and a weighing mechanism configured to weigh food inside the cooking cup; the holder has a first end and a second end; the first end protrudes into and is underneath the heating tray assembly; the transmission wheel is mounted on the first end of the holder; the second end is fixed to the housing; the motor is fixed to the second end; the weighing mechanism is arranged below the first end of the holder; the heating tray assembly is supported on the weighing mechanism;

wherein the weighing mechanism includes a sensor configured to weigh, an upper holder configured to abut against and press one end of the sensor, and a lower holder configured to support the other end of the sensor;

wherein the lower holder has a U shape; two ends of the lower holder are fixedly connected to the holder; the sensor is fixed to the bottom of the lower holder, and wherein the bottom of the lower holder extends in the directions of two sides of the lower holder to form a supporting plate.

2. The cooking machine for weighing food of claim 1, wherein the cooking machine for weighing food further includes multiple groups of elastic assemblies configured to elastically support the heating tray assembly; each of the elastic assemblies is connected to the weighing mechanism.

3. The cooking machine for weighing food of claim 2, wherein each of the elastic assemblies is connected to the upper holder.

4. The cooking machine for weighing food of claim 3, wherein the upper holder includes an abutting and pressing plate configured to abut against and press the sensor, and four connecting poles respectively arranged at four corners of the abutting and pressing plate; the elastic assemblies are divided into four groups arranged at the bottom of the heating tray assembly; the four groups of elastic assemblies are respectively connected to the four connecting poles.

5. The cooking machine for weighing food of claim 4, wherein a central portion of the abutting and pressing plate abuts against and presses the sensor; and a width of the central portion of the abutting and pressing plate is narrower than a width of two ends of the abutting and pressing plate.

6. The cooking machine for weighing food of claim 5, wherein each group of the elastic assemblies include a bolt fixedly connected to the heating tray assembly and a spring sheathed around the bolt; each of the connecting poles is provided with a through hole; the bolt is inserted into a corresponding through hole in a sliding way; two ends of the spring respectively abut against and push the heating tray assembly and one of the four connecting poles that corresponds to the spring.

7. The cooking machine for weighing food of claim 6, wherein each group of the elastic assemblies further include a gasket which is arranged between the spring and one of the four connecting poles that corresponds to the spring.

8. The cooking machine for weighing food of claim 1, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

9. The cooking machine for weighing food of claim 2, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

10. The cooking machine for weighing food of claim 3, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

11. The cooking machine for weighing food of claim 4, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

12. The cooking machine for weighing food of claim 5, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

13. The cooking machine for weighing food of claim 6, wherein the transmission mechanism includes a driven wheel connected to the transmission wheel, a driving wheel connected to the motor, and a belt configured to connect the driven wheel to the driving wheel; the driven wheel and the driving wheel are both mounted in the holder in a rotating way.

* * * * *